(12) United States Patent
Chen et al.

(10) Patent No.: US 9,001,482 B2
(45) Date of Patent: Apr. 7, 2015

(54) SHORT-CIRCUIT PROTECTION CIRCUIT OF LIGHT EMITTING DIODE AND SHORT-CIRCUIT PROTECTION METHOD THEREOF AND LIGHT EMITTING DIODE DRIVING APPARATUS USING THE SAME

(71) Applicant: uPI Semiconductor Corp., Hsinchu County (TW)

(72) Inventors: Wei-Jung Chen, Hsinchu County (TW); Wen-Fu Lu, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 72 days.

(21) Appl. No.: 13/802,816

(22) Filed: Mar. 14, 2013

(65) Prior Publication Data

US 2014/0160609 A1  Jun. 12, 2014

(30) Foreign Application Priority Data

Dec. 7, 2012 (TW) .............................. 101146108 A

(51) Int. Cl.
  *H02H 3/20* (2006.01)
  *H05B 37/03* (2006.01)
  *H05B 37/02* (2006.01)

(52) U.S. Cl.
  CPC ................. *H02H 3/20* (2013.01); *H05B 37/03* (2013.01); *H05B 37/02* (2013.01); *Y02B 20/341* (2013.01)

(58) Field of Classification Search
  CPC .......... H02H 3/20; H05B 37/02; H05B 37/03; Y02B 20/341
  USPC .................................................. 361/86, 93.9
  See application file for complete search history.

(56) References Cited

U.S. PATENT DOCUMENTS

| 7,504,783 | B2 | 3/2009 | Zarr | |
| 7,550,934 | B1 * | 6/2009 | Deng et al. | 315/308 |
| 2007/0114951 | A1 * | 5/2007 | Tsen et al. | 315/291 |
| 2011/0043114 | A1 | 2/2011 | Hsu et al. | |
| 2012/0074845 | A1 | 3/2012 | Aoki et al. | |

FOREIGN PATENT DOCUMENTS

| TW | 201215231 | 4/2012 |
| TW | M434939 | 8/2012 |
| TW | 201242432 | 10/2012 |

OTHER PUBLICATIONS

"Office Action of Taiwan Counterpart Application", issued on Dec. 16, 2014, pp. 1-5.

* cited by examiner

*Primary Examiner* — Scott Bauer
(74) *Attorney, Agent, or Firm* — Jianq Chyun IP Office

(57) ABSTRACT

A short-circuit protection circuit of a light emitting diode (LED) is for protecting a plurality of LED strings from a short-circuit condition. The short-circuit protection circuit includes a short-circuit protection unit and a control unit. The short-circuit protection unit is coupled to the plurality of LED strings to execute a short-circuit protection. The control unit coupled to the short-circuit protection unit and the LED strings is configured to control the short-circuit protection unit according to at least one of a feedback voltage and a compensation voltage, so as to determine whether to trigger the short-circuit protection. The feedback voltage is generated from a cross voltage of one of the LED strings, and the compensation voltage is generated according to a comparison result between the feedback voltage and a reference voltage for controlling a power supply of the LED strings.

19 Claims, 16 Drawing Sheets

SHORT-CIRCUIT PROTECTION CIRCUIT OF LIGHT EMITTING DIODE AND SHORT-CIRCUIT PROTECTION METHOD THEREOF AND LIGHT EMITTING DIODE DRIVING APPARATUS USING THE SAME

CROSS-REFERENCE TO RELATED APPLICATION

This application claims the priority benefit of Taiwan application serial no. 101146108, filed on Dec. 7, 2012. The entirety of the above-mentioned patent application is hereby incorporated by reference herein and made a part of this specification.

BACKGROUND OF THE INVENTION

1. Field of Invention

The present invention relates to a short-circuit protection circuit and a short-circuit protection method thereof and an electronic apparatus using the same, and more particularly, to a short-circuit protection circuit, a short-circuit protection method and a light emitting diode driving apparatus related to a light emitting diode.

2. Description of Related Art

With the progress of the semiconductor technology, illumination brightness and illumination efficiency of the light emitting diodes (LEDs) are continuously improved. LED is a new type of cold light source with several advantages such as longer lifetime, small volume, power saving utility, low pollution, high reliability and mass production utility. In addition, LEDs can be widely applied in many fields. For example, an illumination apparatus, a liquid crystal display (LCD) or a backlight source of an advertisement banner.

In the modern LED driving apparatus, the adopted driving circuit structure is the circuit structure of a pulse width modulation based (PWM-based) boost circuit or a PWM-based buck circuit. However, no matter which driving circuit structure is adopted, the short-circuit protection provided by the driving circuit is imperfect. To be specific, the LED driving apparatus sets a plurality of corresponding protection mechanisms in response to different conditions, such as an overvoltage protection, an over-temperature protection or a low voltage lockout. Each of the protection mechanisms generates a certain effect on the current property and the voltage property of the light emitting diode during the execution. Therefore, when an LED module is in a condition where various abnormal states are happened (for example, a portion of the LEDs is short-circuited, and another portion of the LEDs is open-circuited), the short-circuit protection mechanism and other protection mechanisms may affect with each others reciprocally, so that a malfunction is occurred. If the short-circuit of the LED module can not be correctly detected and fixed, a portion of the elements disposed in the LED driving apparatus may be damaged, and may further be burned.

SUMMARY OF THE INVENTION

The present invention provides a short-circuit protection circuit of a light emitting diode (LED) and a short-circuit protection method thereof and an LED driving apparatus using the same. The short-circuit protection circuit, the short-circuit protection method and the LED driving apparatus are capable of executing a short-circuit protection under any operation state of the LED.

The present invention proposes a short-circuit protection circuit of an LED adapted to protect a plurality of LED strings from a short-circuit condition. The short-circuit protection circuit includes a short-circuit protection unit and a control unit. The short-circuit protection unit is coupled to the plurality of LED stings and configured to execute the short-circuit protection. The control unit coupled to the short-circuit protection unit and the LED strings is configured to control the short-circuit protection unit according to at least one of a feedback voltage and a compensation voltage, so as to determine whether to trigger the short-circuit protection. The feedback voltage is generated according to a cross voltage of one of the LED strings, and the compensation voltage is generated according to a comparison result between the feedback voltage and a reference voltage for controlling a power supply of the LED strings.

In one embodiment of the present invention, the short-circuit protection unit includes a plurality of detection units. The detection units are respectively coupled to the LED strings in order to detect whether each of cathode terminal voltages of the LED strings is larger than a protection voltage when the short-circuit protection is triggered. When the detection unit determines that the cathode terminal voltage of the corresponding LED string is larger than the protection voltage, a current is prohibited from flowing through the corresponding LED string by the detection unit.

In one embodiment of the present invention, the feedback voltage is the minimum value of the cathode terminal voltages of the plurality of LED strings.

In one embodiment of the present invention, the control unit includes a first comparator, a second comparator and an AND gate. The first comparator is configured to compare the feedback voltage with a first voltage in order to generate a first comparison signal. The second comparator is configured to compare the compensation voltage with a second voltage in order to generate a second comparison signal. The AND gate is coupled to the first comparator and the second comparator to generate a first logic signal according to the first comparison signal and the second comparison signal.

In one embodiment of the present invention, when the feedback voltage is larger than the first voltage and the compensation voltage is lower than the second voltage, the enabled first logic signal is generated by the AND gate according to the first comparison signal and the second comparison signal to trigger the short-circuit protection.

In one embodiment of the present invention, the control unit further includes a determination circuit and an OR gate. The determination circuit is configured to determine whether the feedback voltage is substantially equal to the reference voltage, so as to generate a determination signal. When the feedback signal is substantially equal to the reference voltage, the determination circuit generates the enabled determination signal. The OR gate coupled to the AND gate and the determination circuit generates a second logic signal according to the first logic signal and the determination signal.

In one embodiment of the present invention, when at least one of the first logic signal and the determination signal is enabled, the OR gate generates the enabled second logic signal to trigger the short-circuit protection.

In one embodiment of the present invention, the control unit includes a first comparator and a first delay unit. The first comparator is configured to compare the feedback voltage with the first voltage to generate the first comparison signal. The first delay unit coupled to the first comparator is configured to delay the first comparison signal.

In one embodiment of the present invention, when the feedback voltage is larger than the first voltage, the first comparator generates the enabled first comparison signal, and the first delay unit outputs the enabled first comparison signal to trigger the short-circuit protection after a first delay period.

In one embodiment of the present invention, the control unit further includes the determination circuit and the OR gate. The determination circuit is configured to determine whether the feedback voltage is substantially equal to the reference voltage, so as to generate the determination signal. When the feedback voltage is substantially equal to the reference voltage, the determination circuit generates the enabled determination signal. The OR gate coupled to the first delay unit and the determination circuit is configured to generate a logic signal according to a signal outputted by the first delay unit and the determination signal.

In one embodiment of the present invention, when at least one of the first comparison signal and the determination signal is enabled, the OR gate generates the enabled logic signal to trigger the short-circuit protection.

In one embodiment of the present invention, the control unit includes the second comparator and a second delay unit. The second comparator is configured to compare the compensation voltage with the second voltage, so as to generate the second comparison signal. The second delay unit coupled to the second comparator is configured to delay the second comparison signal.

In one embodiment of the present invention, when the compensation voltage is lower than the second voltage, the second comparator generates the enabled second comparison signal, and the second delay unit outputs the enabled second comparison signal to trigger the short-circuit protection after a second delay period.

In one embodiment of the present invention, the control unit further includes the determination circuit and the OR gate. The determination circuit is configured to determine whether the feedback voltage is substantially equal to the reference voltage, so as to generate the determination signal. When the feedback voltage is substantially equal to the reference voltage, the determination circuit generates the enabled determination signal. The OR gate coupled to the second delay unit and the determination circuit is configured to generate the logic signal according to a signal outputted by the second delay unit and the determination signal.

In one embodiment of the present invention, when at least one of the second comparison signal and the determination signal is enabled, the OR gate generates the enabled logic signal to trigger the short-circuit protection.

The present invention proposes an LED driving apparatus for driving a plurality of LED strings. The LED driving apparatus includes a driving circuit and a short-circuit protection circuit. The driving circuit coupled to a plurality of LED strings is configured to control a power supply of the plurality of LED strings according to a compensation voltage. The driving circuit generates a feedback voltage according to a cross voltage of the LED strings and the compensation voltage according to a comparison result between the feedback voltage and the reference voltage. The short-circuit protection circuit coupled to the driving circuit and the plurality of LED strings is configured to protect the LED strings from short-circuit. The short-circuit protection circuit includes the short-circuit protection unit and the control unit. The short-circuit protection unit coupled to the plurality of LEDs is configured to execute the short-circuit protection, so as to prohibit a current from flowing through the short-circuited LED string. The control unit coupled to the short-circuit protection unit and the plurality of LED strings is configured to control the short-circuit protection unit according to at least one of the feedback voltage and the compensation voltage, so as to determine whether to trigger the short-circuit protection. The feedback voltage is generated according to a cross voltage of one of the LED strings, and the compensation voltage is generated according to a comparison result between the feedback voltage and the reference voltage for controlling the power supply of the plurality of LED strings.

In one embodiment of the present invention, the driving circuit detects cathode terminal voltages of the plurality of LED strings, and the minimum value of cathode terminal voltages of the plurality of LED strings is selected as the feedback voltage.

The present invention proposes a method for an LED short-circuit protection, including: generating a feedback voltage according to a cross voltage of one of the plurality of LED strings; generating a compensation voltage according to a comparison result between the feedback voltage and a reference voltage, wherein the compensation voltage is employed to control a power supply of the plurality of LED strings; and determining whether to trigger the short-circuit protection for prohibiting a current from flowing through the short-circuited LED string according to at least one of the feedback voltage and the compensation voltage.

In one embodiment of the present invention, the step of generating the feedback voltage according to the cross voltage of one of the plurality of LED strings includes: detecting the cathode terminal voltages of the plurality of LED strings; and selecting the minimum value of cathode terminal voltages of the plurality of LED strings as the feedback voltage.

In one embodiment of the present invention, the step of determining whether to trigger the short-circuit protection according to at least one of the feedback voltage and the compensation voltage includes: determining whether the feedback voltage is larger than the first voltage and whether the compensation voltage is lower than the second voltage; and when the feedback voltage is larger than the first voltage and the compensation voltage is lower than the second voltage, triggering the short-circuit protection.

In one embodiment of the present invention, the step of determining whether to trigger the short-circuit protection according to at least one of the feedback voltage and the compensation voltage includes: determining whether the feedback voltage is larger than the first voltage; and when the feedback voltage is larger than the first voltage, triggering the short-circuit protection after a first delay period.

In one embodiment of the present invention, the step of determining whether to trigger the short-circuit protection according to at least one of the feedback voltage and the compensation voltage includes: determining whether the compensation voltage is lower than the second voltage; and when the compensation voltage is lower than the second voltage, triggering the short-circuit protection after a second delay period.

In one embodiment of the present invention, the step of determining whether to trigger the short-circuit protection according to at least one of the feedback voltage and the compensation voltage includes: determining whether the feedback voltage is substantially equal to the reference voltage; and when the feedback voltage is substantially equal to the reference voltage, triggering the short-circuit protection.

In one embodiment of the present invention, when the short-circuit protection is triggered, the short-circuit protection method further includes: detecting whether each of the cathode terminal voltages of the LED strings is larger than a protection voltage; and when the cathode terminal voltage of the LED string is larger than the protection voltage, prohibiting a current from flowing through the corresponding LED string.

Based on the above description, the short-circuit protection circuit of the LED and the short-circuit protection method thereof and the LED driving apparatus using the same are provided by the embodiments in the present invention. The condition of certain parameters of the driving circuit is employed by the short-circuit protection circuit as the basis of triggering the short-circuit protection, so as to avoid a malfunction of the LED under different operation states.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
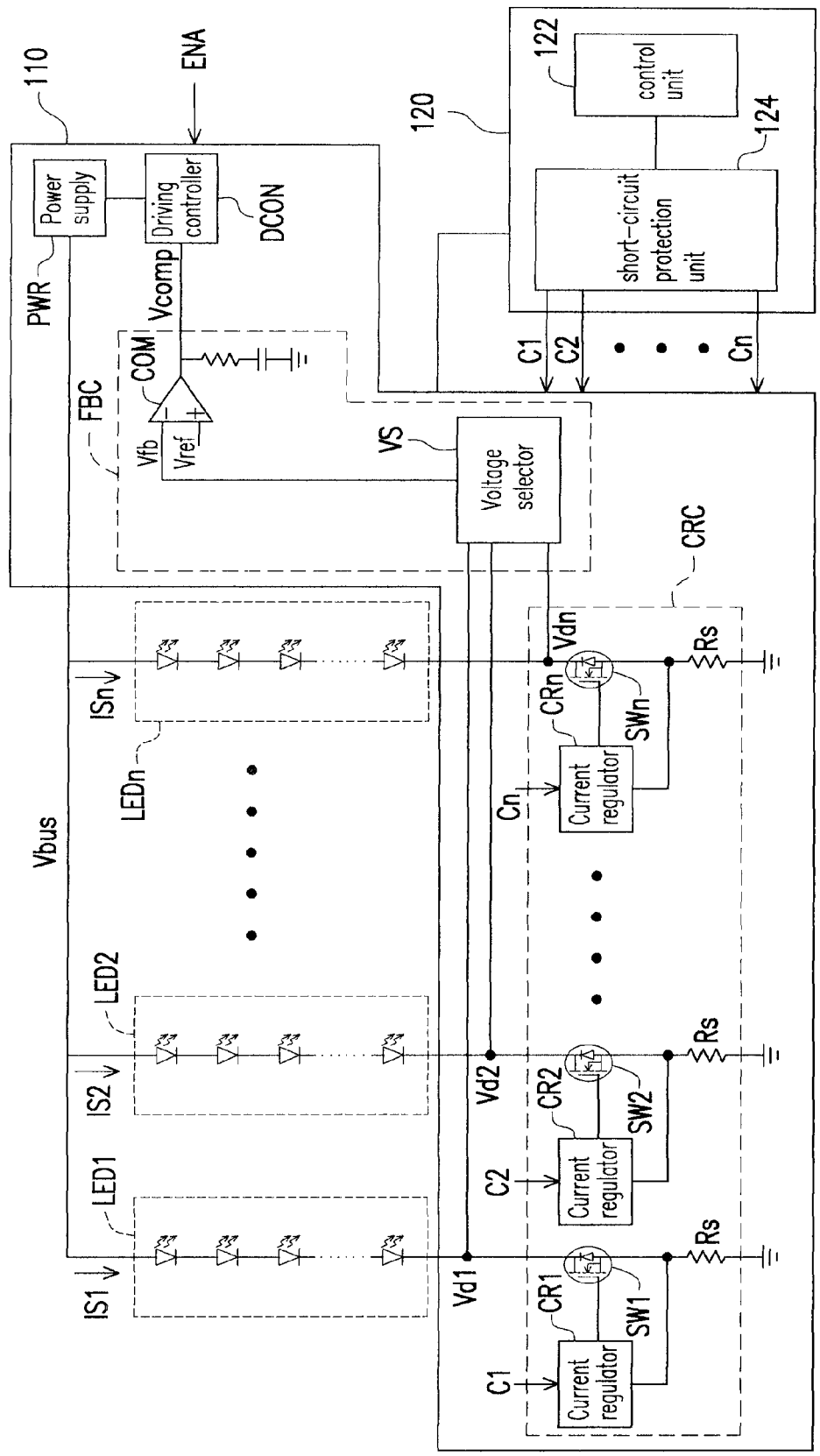
FIG. 1 is a schematic diagram showing an LED driving apparatus according to an embodiment of the present invention.

FIG. 1 is a schematic diagram showing an LED driving apparatus according to an embodiment of the present invention. In the present embodiment, the LED driving apparatus 100 is suitable for driving a plurality of LED strings LED1 to LEDn. Each of the LED strings LED1 to LEDn includes a plurality of LEDs connected in serial. The number of the LED strings LED1 to LEDn (i.e. value of n) and the number of the LED in each of the LED strings LED1 to LEDn can be designed according to the practical requirement, but not limited thereto. Referring to FIG. 1, the LED driving apparatus 100 includes a driving circuit 110 and a short-circuit protection circuit 120. The driving circuit 110 coupled to the LED strings LED1 to LEDn provides power to the LED strings LED1 to LEDn according to an enabled signal ENA, so as to lighten the LED strings LED1 to LEDn. The short-circuit protection circuit 120 coupled to the driving circuit 110 and the LED strings LED1 to LEDn is configured to perform the short-circuit protection for the LED strings LED1 to LEDn.

In the present embodiment, the driving circuit 110 includes a power supply PWR, a driving controller DCON, a feedback compensation circuit FBC and a current regulation circuit CRC shown in FIG. 1 as an example for the following description, but it should be noted that the driving circuit of the present invention is not limited thereto. The power supply PWR provides a driving voltage Vbus to each of the anode terminals of the LED strings LED1 to LEDn, such that each of the LED strings LED1 to LEDn generates currents IS1 to ISn respectively flowing through the LED strings LED1 to LEDn in response to the driving voltage Vbus. The current regulation circuit CRC is controlled by the driving controller DCON for controlling the degree of the conduction of switches SW1 to SWn which are respectively coupled to the LED strings LED1 to LEDn in serial, so as to control the brightness of the LED strings LED1 to LEDn.

The feedback compensation circuit FBC detects the driving statuses (e.g. current or voltage) of each of the LED strings for generating a compensation voltage Vcomp, and the driving controller DCON controls the power supplying status of the power supply PWR and the operation of the current regulation circuit CRC according to the compensation voltage Vcomp. For example, a voltage selector VS employed by the feedback compensation circuit FBC is configured to detect cathode terminal voltages Vd1 to Vdn of the LED strings LED1 to LEDn. The voltage selector VS selects the minimum value of the cathode terminal voltages Vd1 to Vdn as a feedback voltage Vfb and feedbacks the feedback voltage Vfb to a comparator COM. The comparator COM compares the feedback voltage Vfb with a predetermined reference voltage Vref and outputs the compensation voltage Vcomp to the driving controller DCON according to a comparison result between the feedback voltage Vfb and the reference voltage Vref.

The driving controller DCON is, for example, a pulse-width modulation (PWM) controller using a PWM signal to control the current regulation circuit CRC, and the LED strings are operated at a constant current for illumination. In addition, the driving controller DCON controls the power supply PWR according to the received compensation voltage Vcomp and other circuit protection mechanisms (such as overvoltage protection, over temperature protection and low voltage lockout), in order to adjust the level of the driving voltage Vbus.

On the other hand, the short-circuit protection circuit 120 includes a short-circuit protection unit 124 and a control unit 122. The control unit 122 is configured to control the operation of the short-circuit protection unit 124. The short-circuit protection unit 124 coupled to the control unit 122 is configured to execute the short circuit protection, so as to prohibit the currents IS1 to ISn from respectively flowing through the short-circuited LED strings LED1 to LEDn. Specifically, when the short-circuit protection is executed by the short-circuit protection unit 124, the short-circuit protection unit 124 continuously detects whether the short-circuit is occurred at each of the LED strings LED1 to LEDn and generates a plurality of signals C1 to Cn for controlling current regulators CR1 to CRn, so that the corresponding switches SW1 to SWn are respectively turned off in response to the control of the current regulators CR1 to CRn, and the currents are prohibited from flowing through the short-circuited LED strings LED1 to LEDn.

To be specific, the cross voltages of the LED strings LED1 to LEDn are usually compared with the predetermined protection voltage under the short-circuit protection for determining at least one of the LED string is short-circuit when the corresponding cross voltages of the LED strings LED1 to LEDn is too high. Since other protection mechanisms (such as the overvoltage protection) may be performed during an initial period of activating the LED driving apparatus 100, the cross voltages of the LED strings may be affected. If the short-circuit protection is executed at the time of activating the LED driving apparatus 100, a malfunction may be occurred in the short-circuit protection circuit 120 due to the unstable cross voltages of the LED strings LED1 to LEDn.

Therefore, in the present embodiment, the control unit 122 controls the operation of the short-circuit protection unit 124 based on at least one of the feedback voltage Vfb and the compensation voltage Vcomp generated by the driving circuit to determine whether the short-circuit protection should be triggered, so that the malfunction of the short-circuit protection circuit 120 can be effectively avoided.

It should be noted that, each of the corresponding LED strings LED1 to LEDn is determined to be short-circuited by the short-circuit protection unit 124 when a certain number of the total LEDs in the LED string are short-circuited, so the short-circuit condition of each of the LED strings LED1 to LEDn is not only limited to the condition that each of the LEDs in the LED string are short-circuited. Moreover, the number of the short-circuited LEDs which is set for determining the short-circuit condition of each of the LED strings LED1 to LEDn can be chosen depending on the setting of the protection voltage, and the present invention is not limited thereto.

Figure 2:
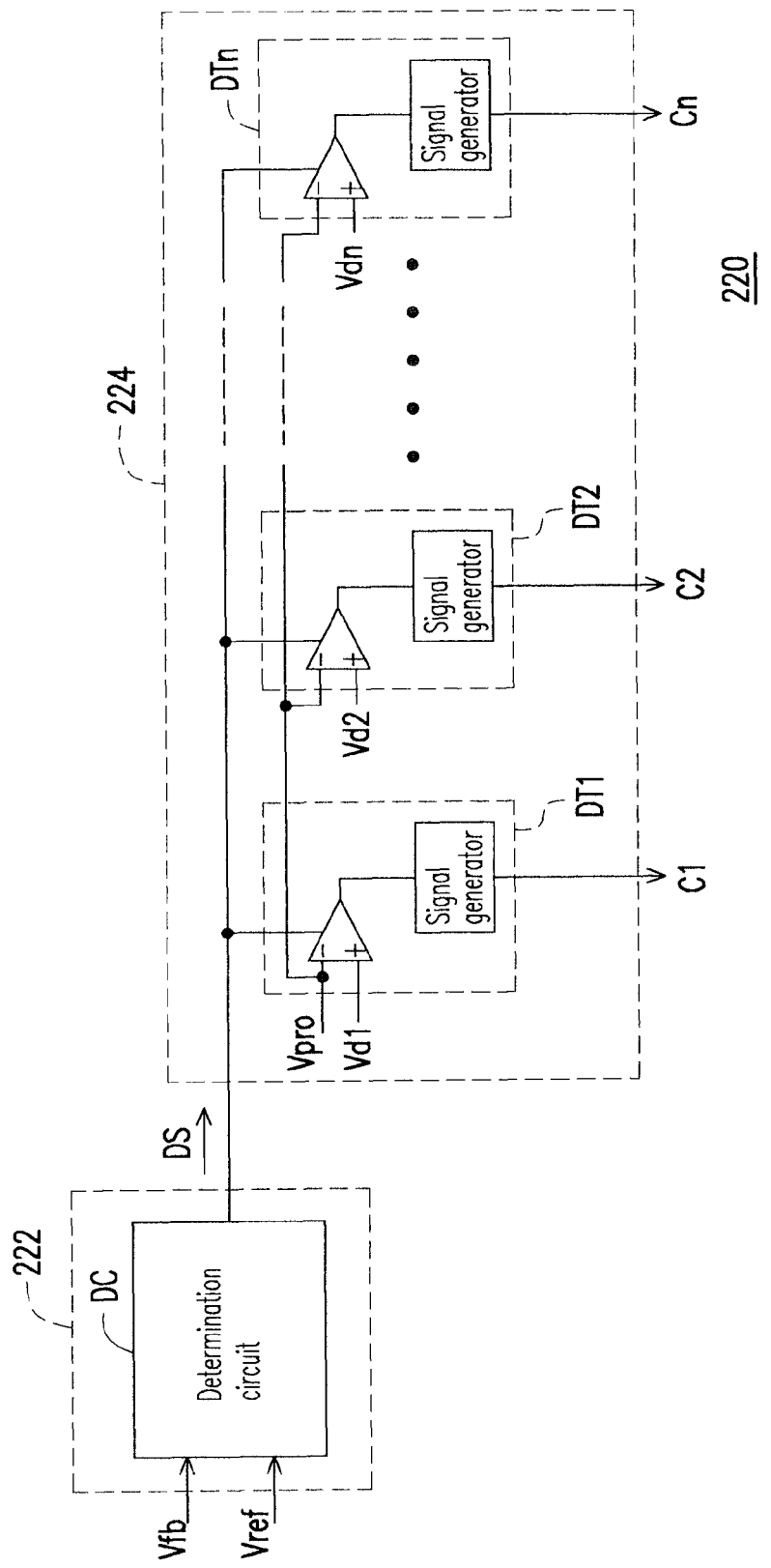
FIG. 2 is a schematic diagram showing a short-circuit protection circuit of an LED according to an embodiment of the present invention.

FIG. 2 is a schematic diagram showing a short-circuit protection circuit of an LED according to an embodiment of the present invention. Referring to FIGS. 1 and 2, in the present invention, the short-circuit protection circuit 220 is adapted in the LED driving apparatus 100 to perform short-circuit protection for the LED strings LED1 to LEDn. The short-circuit protection circuit 220 includes a control unit 222 and a short-circuit protection unit 224. Further, the control unit 224 includes a determination circuit DC, and the short-circuit protection unit 224 includes a plurality of detection units DT1 to DTn respectively coupled to the LED strings LED1 to LEDn.

In the present embodiment, the determination circuit DC determines whether the feedback voltage Vfb is substantially equal to the reference voltage Vref, so as to generate a determination signal DS for determining whether to trigger the short-circuit protection of the short-circuit protection unit 224. Under a situation that the short-circuit protection of the short-circuit protection unit 224 is triggered by the determination signal DS, the detection units DT1 to DTn respectively detect each of the cathode terminal voltages Vd1 to Vdn of the LED strings LED1 to LEDn to determine whether each of the cathode terminal voltages Vd1 to Vdn is larger than the protection voltage Vpro. When one of the cathode terminal voltages Vd1 to Vdn of the corresponding LED string LED1 to LEDn respectively detected by the detection units DT1 to DTn is larger than the protection voltage Vpro, the corresponding detection unit (DT1 to DTn) outputs a corresponding signal (C1 to Cn) for prohibiting the current from flowing through the short-circuited LED string (LED1 to LEDn).

For example, when the LED string LED1 is determined to be short-circuited by the short-circuit protection unit 224 according to the comparison result between the cathode terminal voltage Vd1 and the protection voltage Vpro, the detection unit DT1 outputs the corresponding signal C1 to the current regulator CR1, and the switch SW1 is turned off by the current regulator CR1 in response to the control of the signal C1. The current path of the LED string LED1 is open-circuited due to the turned-off state of the switch SW1, so the current is prohibited from flowing through the LED string LED1.

Figure 3A:
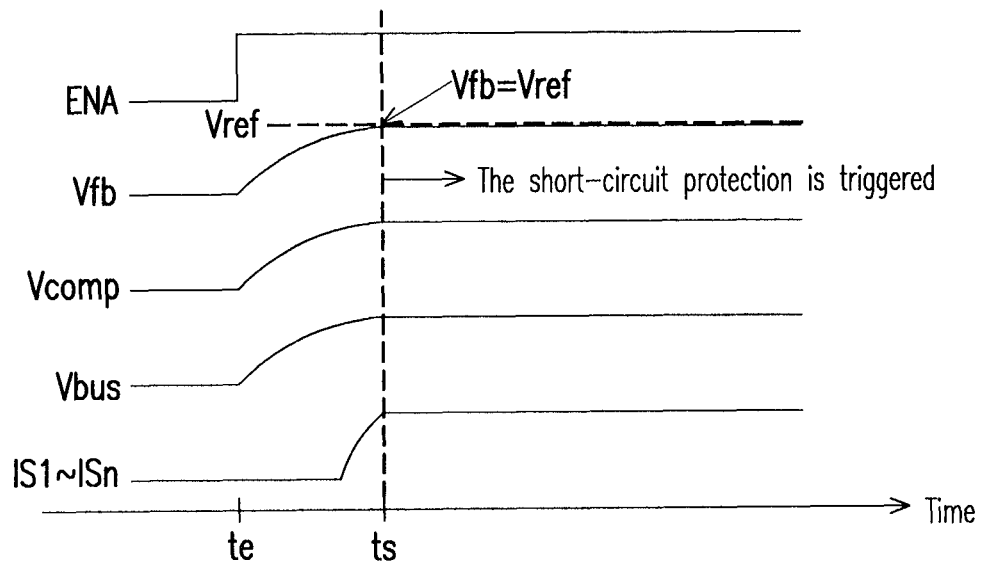
FIG. 3A-3D are signal timing diagrams of the LED driving apparatus according to the embodiment shown in FIG. 2 of the present invention.

For further describe the embodiment shown in FIG. 2, FIG. 3A to 3D are signal timing diagrams of the LED driving apparatus according to the embodiment shown in FIG. 2 of the present invention. FIG. 3A is the signal timing diagram of the LED driving apparatus under a situation that no short-circuit condition or open-circuit condition is occurred at the LED strings LED1 to LEDn. Referring to FIGS. 2 and 3A, after the driving circuit 110 receives an enabled signal ENA at time te, the power supply PWR starts providing the driving voltage Vbus to drive the LED strings LED1 to LEDn, so that the feedback compensation circuit FBC generates the feedback voltage Vfb according to the minimum value of the cathode terminal voltages Vd1 to Vdn of the LED strings LED1 to LEDn, and generates a compensation voltage Vcomp according to a comparison result between the feedback voltage Vfb and the reference voltage Vref.

When the feedback voltage Vfb is lower than the reference voltage Vref, the driving controller DCON controls the power supply PWR to increase the level of the driving voltage Vbus according to the compensation voltage Vcomp. The feedback voltage Vfb is increased following the increase of the driving voltage Vbus until the feedback voltage Vfb is as same as the reference voltage Vref, and then the power supply PWR is controlled by the driving controller DCON to maintain the driving voltage Vbus at a fixed level. At the same time, the corresponding determination signal DS is also generated by the determination circuit DC for triggering the short-circuit protection of the short-circuit protection circuit 224, and each of the LED strings is detected to determine whether the short-circuit condition is occurred after the time ts.

Figure 3B:
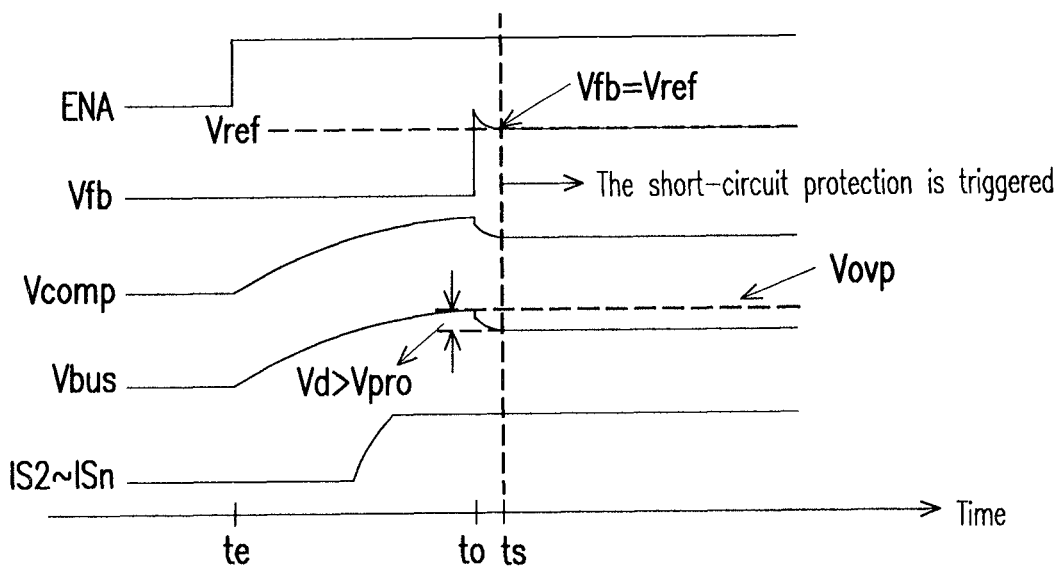

FIG. 3B is the signal timing diagram of the LED driving apparatus 100 under a situation that at least one of the LED strings LED1 to LEDn is open-circuited. Referring to FIGS. 2 and 3B and taking the operation condition that the LED string LED1 is open-circuited as an example, since the cathode terminal voltage Vd1 of the open-circuited LED string LED1 is maintained in the low level (such as a ground voltage GND) and is not increased following the increase of the driving voltage Vbus, the feedback voltage Vfb is continuously lower than the reference voltage Vref, such that the level of the driving voltage Vbus is continuously increased by the power supply PWR. However, when the overvoltage protection circuit (not illustrated) in the driving circuit 110 detects that the level of the driving voltage Vbus is same as the level of the predetermined overvoltage protection voltage Vovp at the time to, the overvoltage protection circuit determines the LED string LED1 to be open-circuited and executes the overvoltage protection, so as to disable the LED string LED1 (i.e. disabling the detection of the cathode terminal voltage Vd1 of the LED string LED1) and select the minimum value from the cathode terminal voltages Vd1 to Vdn of the rest of LED strings LED2 to LEDn as the feedback voltage Vfb. Under a situation that the rest of LED strings are normal, the feedback voltage Vfb is increased to a level higher than the level of the reference voltage Vref, and the levels of the driving voltage Vbus and the compensation voltage Vcomp are gradually decreased by the driving circuit 110 due to the operation of the overvoltage protection until the feedback voltage Vfb is close to the reference voltage Vref. Thus, the short-circuit protection is triggered by the short-circuit protection circuit 220, and each of the LED strings is detected to determine whether the short-circuit condition is occurred after the time ts.

Figure 3C:
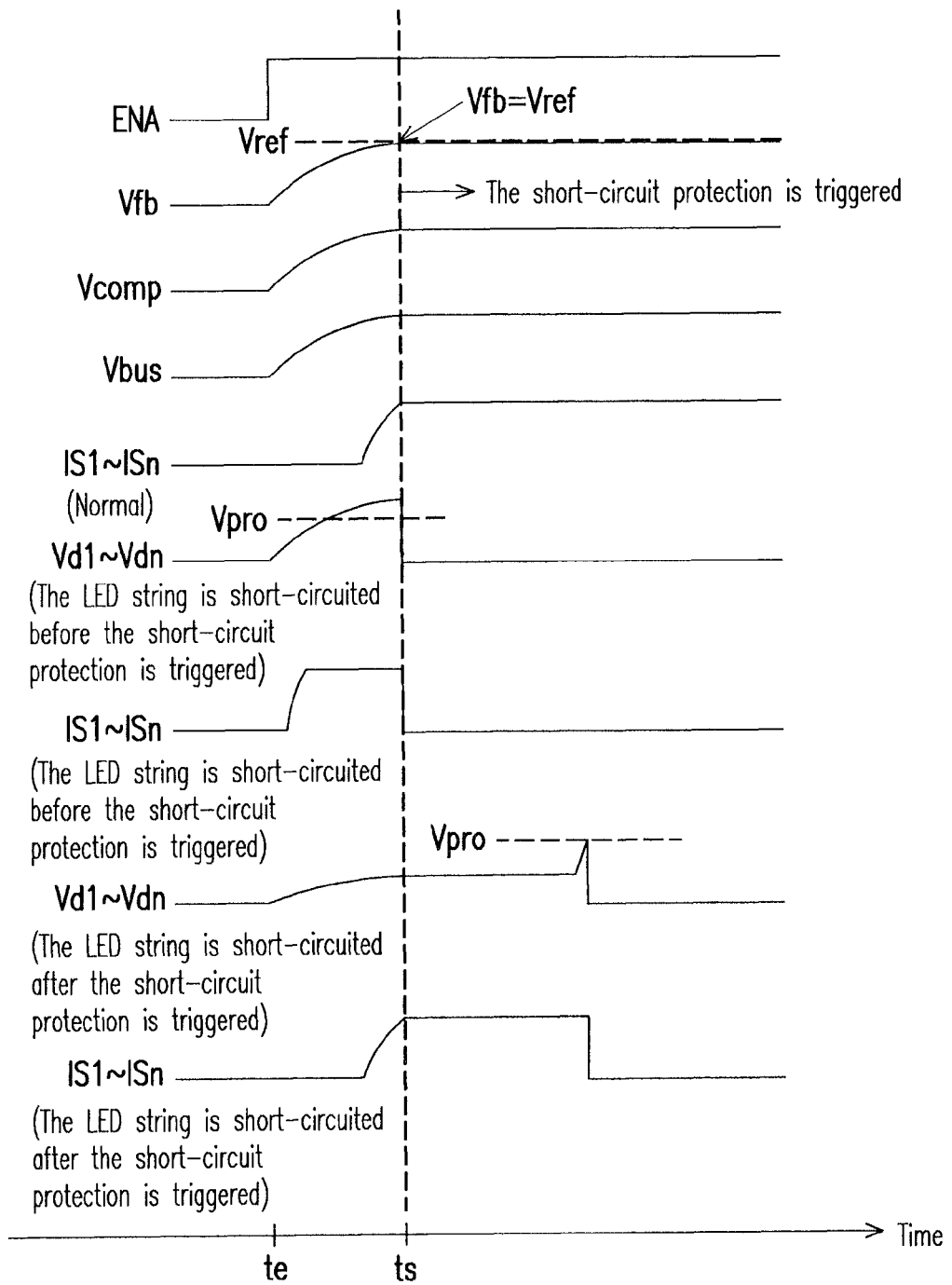

FIG. 3C is the signal timing diagram of the LED driving apparatus 100 under a situation that at least one of the LED strings LED1 to LEDn is short-circuited. Referring to FIGS. 2 and 3C, if the short-circuit condition is occurred at the LED strings LED1 to LEDn before triggering the short-circuit protection, each of the cathode terminal voltages Vd1 to Vdn of the LED strings is still increased in response to the increase of the driving voltage Vbus until the short-circuit protection is triggered. After the short-circuit protection is triggered by the short-circuit protection circuit 220 at the time ts, the detection unit (DT1 to DTn) is capable of detecting that the cathode terminal voltage (Vd1 to Vdn) of the short-circuited LED string (LED1 to LEDn) is larger than the protection voltage Vpro, so as to transmit the corresponding signal (C1 to Cn) to turn off the corresponding switch (SW1 to SWn) and thus the cathode terminal voltage (Vd1 to Vdn) is in a floating state, and the current (IS1 to ISn) is prohibited from flowing through the short-circuited LED string (LED1 to LEDn).

On the other hand, if the short-circuit condition is occurred at the LED strings LED1 to LEDn after the short-circuit protection is triggered, the detection unit (DT1 to DTn) detects that the cathode terminal voltage (Vd1 to Vdn) is increased to the protection voltage Vpro at the time where the short-circuit condition is occurred, so the detection unit (DT1 to DTn) immediately transmits the corresponding signal (C1 to Cn) for turning off the switch (SW1 to SWn) corresponding to the short-circuited LED string (LED1 to LEDn), so as to prohibit the current (IS1 to ISn) from flowing through the short-circuited LED string (LED1 to LEDn).

To be specific, under the operation that at least one of the LED strings LED1 to LEDn is short-circuited, if the short-circuit protection is executed from the time that the LED strings are activated, within the period of executing the overvoltage protection until the feedback voltage Vfb steadily approaching to the reference voltage Vref, the cathode terminal voltages Vd1 to Vdn of the LED strings LED1 to LEDn may be higher than the protection voltage Vpro, and the LED strings which are normally operated may be turned off by the short-circuit protection circuit 220. By contrast, in the present embodiment, since the short-circuit protection is triggered by the short-circuit protection circuit 220 when the feedback voltage Vfb is substantially equal to the reference voltage Vref, the malfunction caused by a portion of the open-circuited LED strings can be effectively avoided by the short-circuit protection circuit 220.

However, if one or more of the LED strings LED1 to LEDn are short-circuited, and the other LED strings (LED1 to LEDn) are open-circuited, the condition for triggering the short-circuit protection (i.e. the feedback voltage Vfb is substantially equal to the reference voltage Vref) may conversely become an obstacle of triggering the short-circuit protection.

Figure 3D:
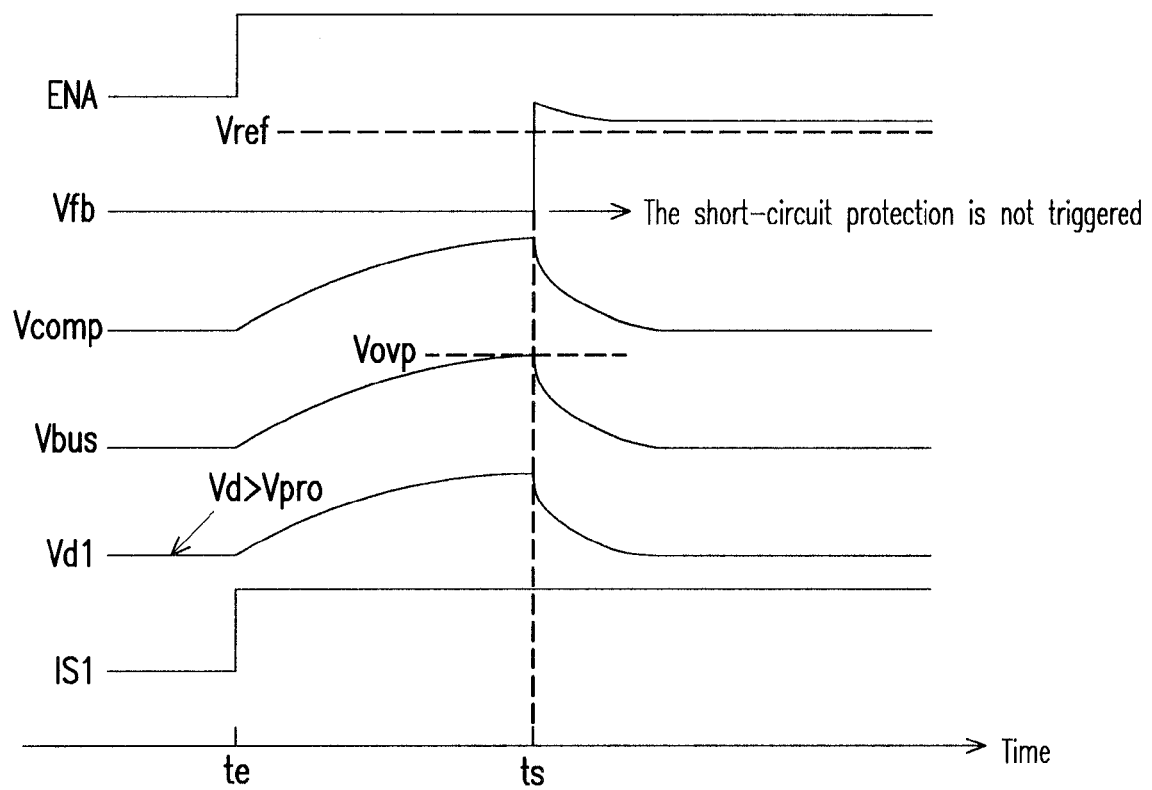

In details, FIG. 3D is the signal timing diagram of the LED driving apparatus 100 under a situation that at least one of the LED strings LED1 to LEDn is short-circuited, and the other LED strings (LED1 to LEDn) are open-circuited. Referring to FIGS. 2 and 3D, taking the operation condition that the LED string LED1 is short-circuited and the LED strings LED2 to LEDn are open-circuited as the example, when the level of the driving voltage Vbus reaches the level of the predetermined overvoltage protection voltage Vovp, the overvoltage protection is executed by the driving circuit 100 to disable the cathode terminal voltages Vd2 to Vdn which are open-circuited, and the levels of the compensation voltage Vcomp and the driving voltage Vbus are gradually decreased. Thus, the cathode terminal voltage Vd1 of the short-circuited LED string LED1 is selected as the feedback voltage Vfb, but the level of the feedback voltage Vfb would not decrease to the level lower than the reference voltage Vref following the driving voltage Vbus, so the short-circuit protection of the short-circuit protection unit 224 can not be triggered by the determination circuit DC based on the trigger condition that the feedback voltage Vfb is substantially equal to the reference voltage Vref. In other words, under such operation condition, the short-circuited LED string LED1 would not be turned off, and the power is continuously provided to the LED string LED1. As the result, the LED driving apparatus 100 and the LED strings LED1 to LEDn may be damaged.

Figure 4A:
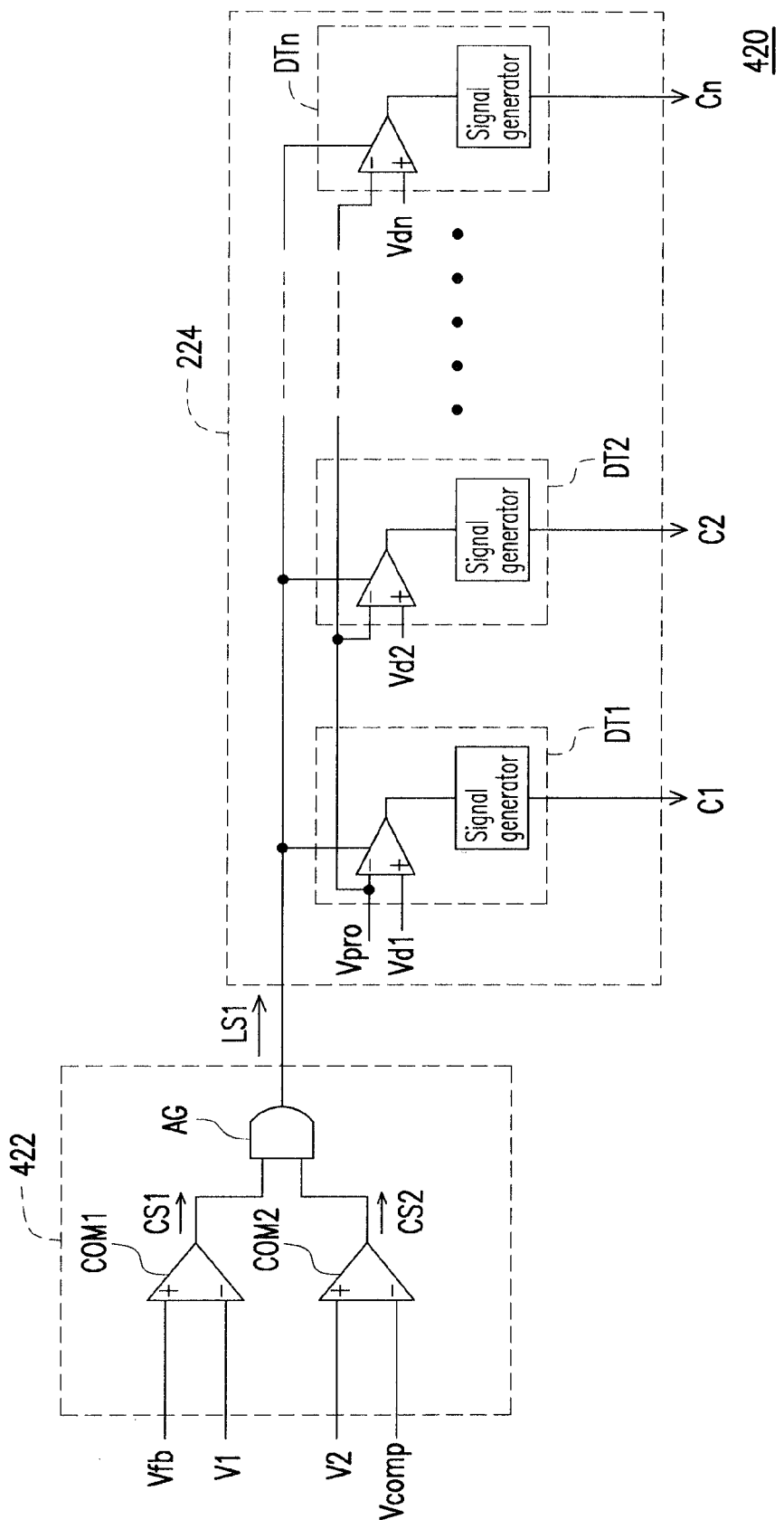
FIG. 4A is a schematic diagram showing a short-circuit protection circuit of an LED according to another embodiment of the present invention.
Figure 5:
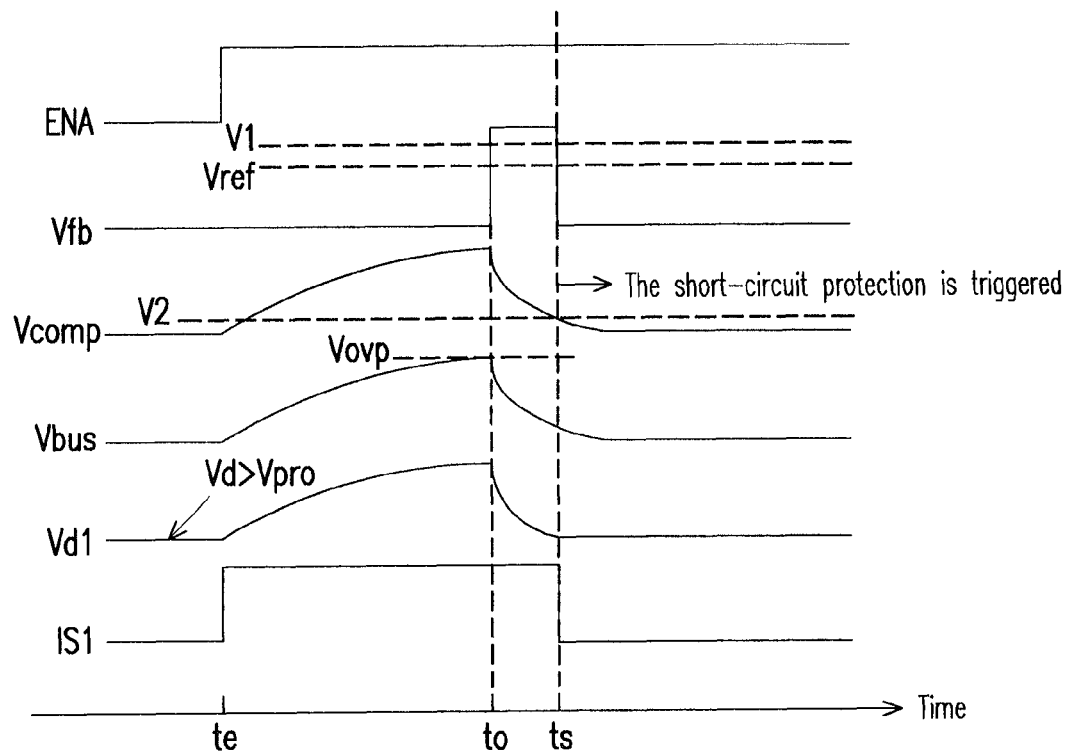
FIG. 5 is a signal timing diagram of the LED driving apparatus according to the embodiment shown in FIG. 4A of the present invention.

To solve the problem caused by the operation condition described above, different short-circuit protection circuit are further proposed in the following embodiments. Referring to FIGS. 4A and 5, FIG. 4A is a schematic diagram showing a short-circuit protection circuit of an LED according to another embodiment of the present invention. FIG. 5 is a signal timing diagram of the LED driving apparatus according to the embodiment shown in FIG. 4A of the present invention. Herein, the short-circuit protection circuit 420 is also suitable for the LED driving apparatus 100 in executing the short-circuit protection to the LED strings LED1 to LEDn.

In the present embodiment, the short-circuit protection circuit 420 includes a control unit 422 and a short-circuit protection unit 224, where the short-circuit protection unit 244 is as same as the short-circuit protection unit 244 shown in the embodiment of FIG. 2, so the short-circuit protection unit 244 is not described herein. The control unit 422 includes comparators COM1 and COM2 and an AND gate AG. The comparator COM1 is configured to compare the feedback voltage Vfb with the predetermined first voltage V1 and to generate the comparison signal CS1 according to the comparison result. The comparator COM2 is configured to compare the compensation voltage Vcomp with the predetermined second voltage V2 and to generate the comparison signal CS2 according to the comparison result. To avoid the malfunction of the control unit, the level of the first voltage V1 is set a bit higher than the level of the reference voltage Vref, and the level of the second voltage V2 is set a bit higher than the level of the ground voltage GND. The AND gate AG coupled to the comparators COM1 and COM2 is configured to execute the AND operation according to the comparison signals CS1 and CS2, so as to generate the logic signal LS1.

To be specific, when a portion of the LED strings is short-circuited and another portion of the LED strings is open-circuited, the feedback voltage Vfb of the driving circuit is increased to the level higher than the first voltage V1 after the time to where the overvoltage protection is executed, and the level of the compensation voltage Vcomp is gradually decreased after the time to. Therefore, based on the previous description, the control unit 422 respectively using and comparing the levels of the feedback voltage Vfb and the compensation voltage Vcomp with the first voltage V1 and the second voltage V2 to trigger the short-circuit protection in the present embodiment.

Similarly, taking the operation condition that the LED string LED1 is short-circuited and the rest of LED strings LED2 to LEDn are open-circuited as the example, when the feedback voltage Vfb is larger than the first voltage V1 and the compensation voltage Vcomp is lowered than the second voltage V2 (at the time ts), the comparators COM1 and COM2 respectively output the enabled comparison signals CS1 and CS2, so the AND gate AG outputs the enabled logic signal LS1 in response to the enabled comparison signals CS1 and CS2 to trigger the short-circuited protection of the short-circuit protection unit 224, so that the current is prohibited from flowing through the short-circuited LED string LED1. Therefore, the short-circuit protection circuit 420 provided in the present embodiment effectively solves the problem that the short-circuit protection can not be triggered under the operation condition that a portion of the LED strings is short-circuited and another portion of the LED strings is open-circuited.

Figure 4B:
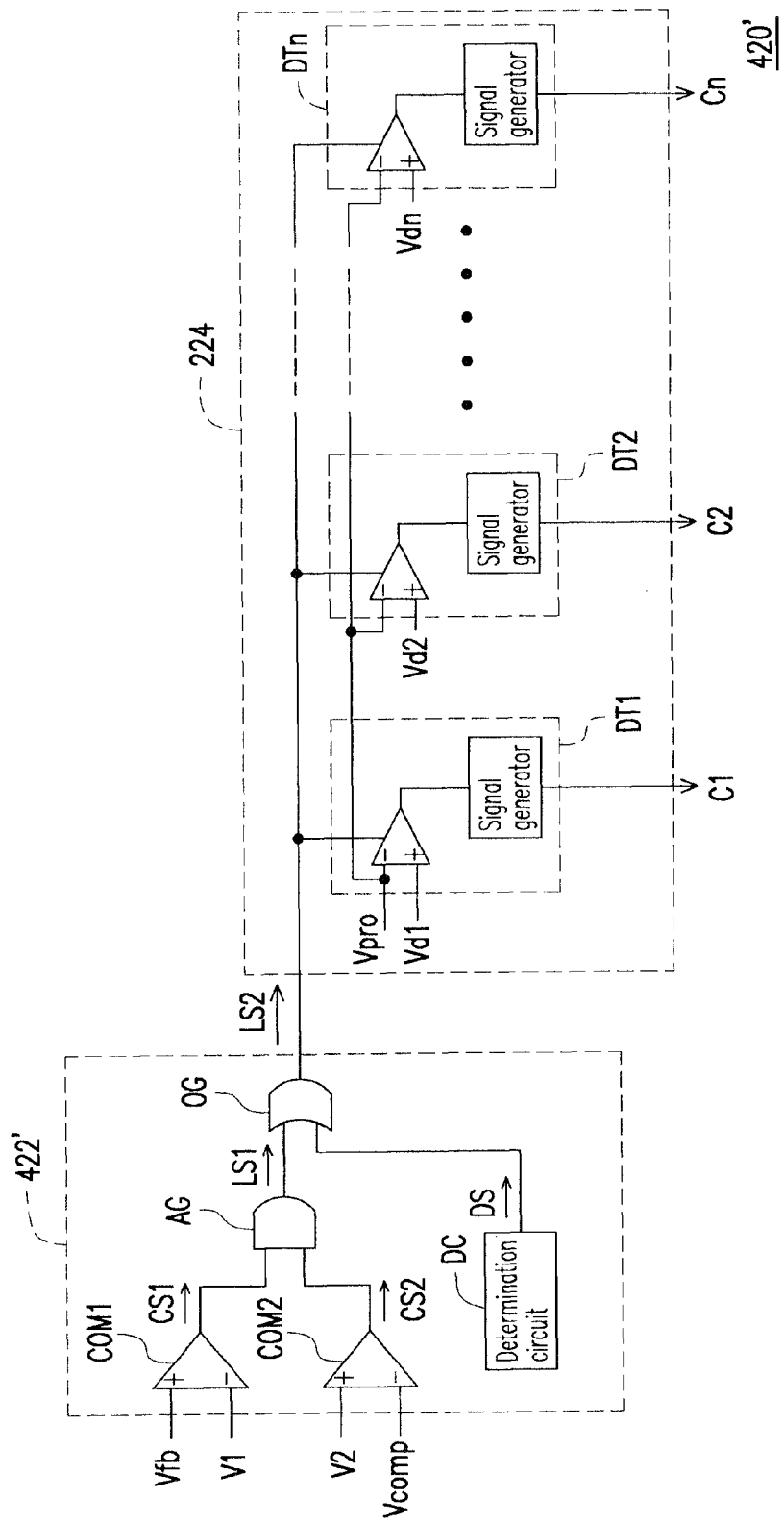
FIG. 4B is a schematic diagram showing a short-circuit protection circuit of an LED according to another embodiment of the present invention.

FIG. 4B is a schematic diagram showing a short-circuit protection circuit of an LED according to another embodiment of the present invention. Referring to FIG. 4B, the short-protection circuit 420' includes the control unit 422' and the short-circuit protection unit 224, where the structure and the operation method of the short-circuit protection circuit 420' are as same as the structure and the operation method of the short-circuit protection circuit 420 shown in the embodiment of the present invention. The difference between the short-circuit protection circuit 420' and the short-circuit protection circuit 420 is that the control unit 422' in the present embodiment is further configured to trigger the short-circuit protection of the short-circuit protection unit 224 according to a plurality of trigger conditions.

Specifically, compared with the control unit 422 described above, the control unit 422' further includes the determination circuit DC and the OR gate OG The determination circuit DC in the present embodiment is as same as the determination circuit DC shown in the embodiment of FIG. 2. The determination circuit DC determines whether the feedback voltage Vfb is substantially equal to the reference voltage Vref to generate the corresponding determination signal DS. The two input terminals of the OR gate OG are respectively coupled to the output terminal of the AND gate AG and the determination circuit DC to receive the logic signal LS1 and the determination signal DS, so as to generate the logic signal LS2 for triggering the short-circuit protection of the short-circuit protection unit 224. In addition, the OR gate OG performs the OR operation to the logic signal LS1 and the determination signal DS, so that the enabled logic signal LS2 can be generated to trigger the short-circuit protection under the situation that at least one of the logic signal LS1 and the determination signal DS is enabled.

Furthermore, the signal timing of the LED driving apparatus using the short-circuit protection circuit 420' may be referred to as that described in the embodiment in FIG. 3A to 3C and 5 and thus will not be further described hereinafter.

Figure 6:
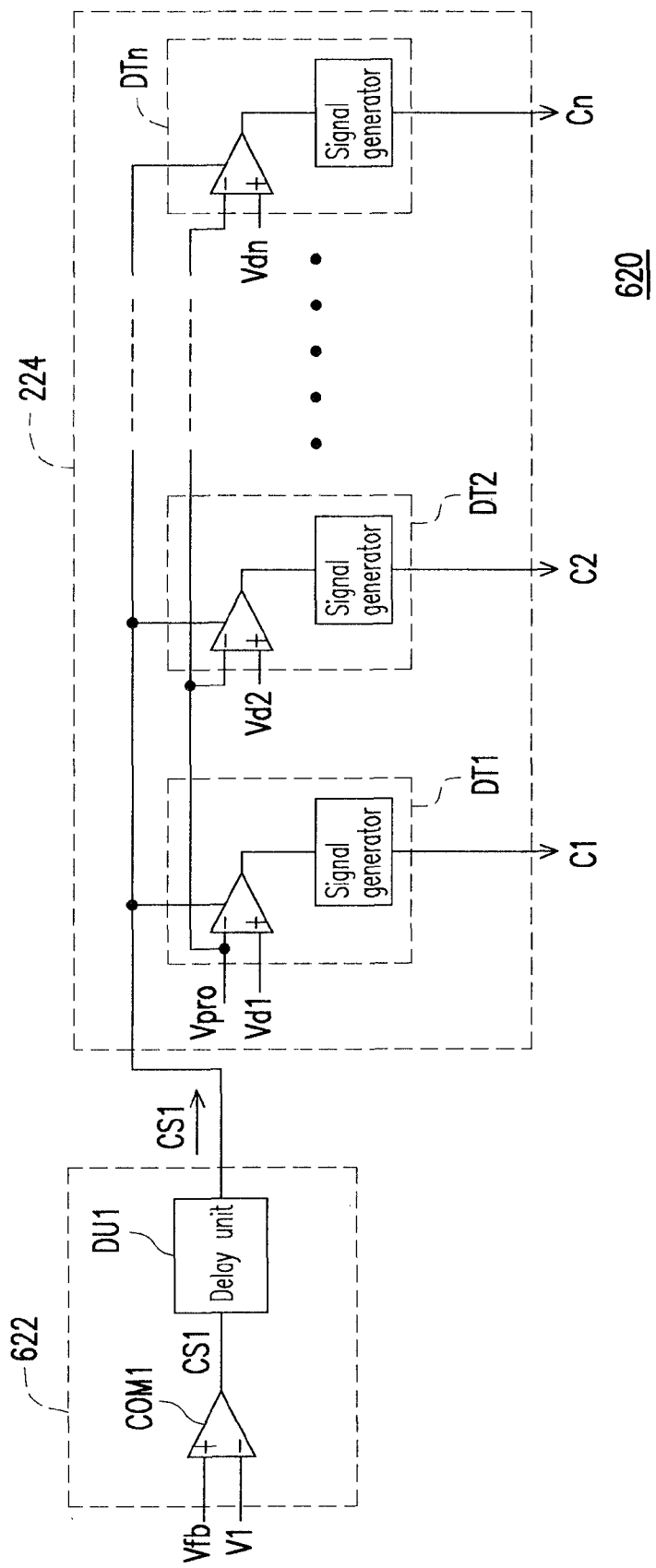
FIG. 6 is a schematic diagram showing a short-circuit protection circuit of an LED according to another embodiment of the present invention.
Figure 7:
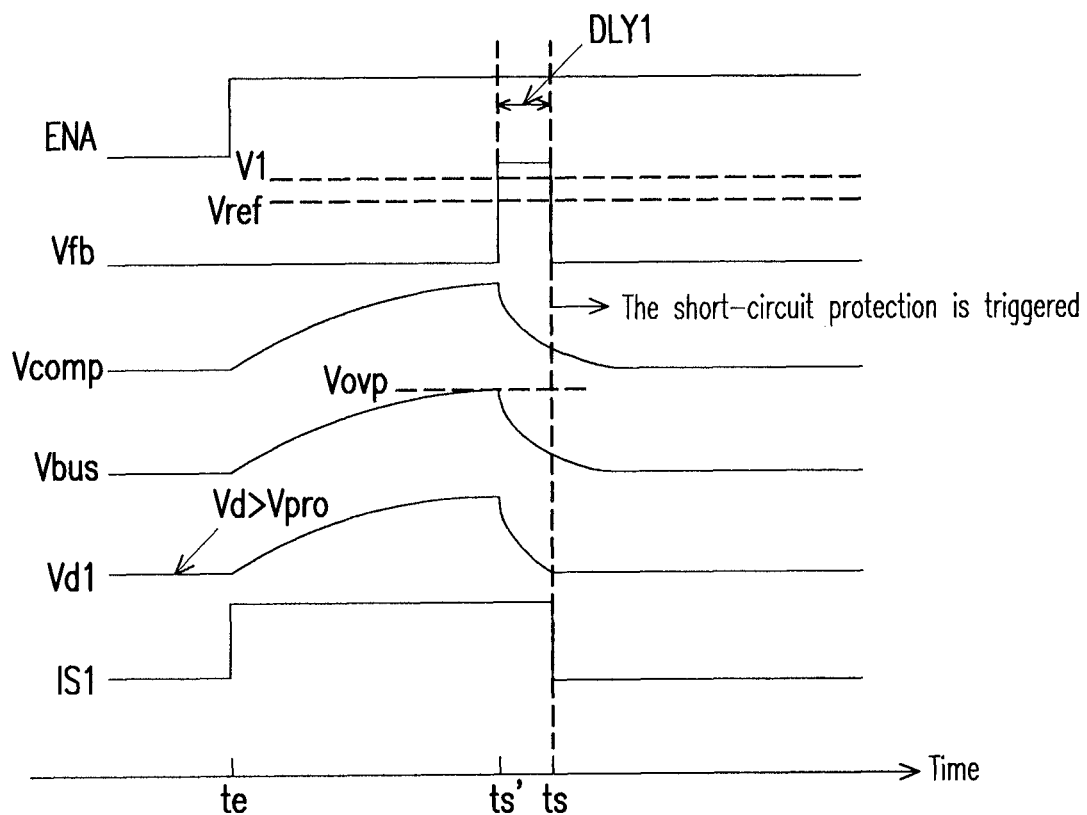
FIG. 7 is a signal timing diagram of the LED driving apparatus according to the embodiment shown in FIG. 6 of the present invention.

FIG. 6 is a schematic diagram showing a short-circuit protection circuit of an LED according to another embodiment of the present invention. FIG. 7 is a signal timing diagram of the LED driving apparatus according to the embodiment shown in FIG. 6 of the present invention. Here, the short-circuit protection circuit 620 is also adapted to execute the short-circuit protection to the LED strings LED1 to LEDn in the LED driving apparatus 100.

Referring to FIGS. 6 and 7, the short-circuit protection circuit 620 includes the control unit 622 and the short-circuit protection unit 224, where the structure and the operation method of the short-circuit protection unit 224 are as same as the structure and the operation method of the short-circuit protection unit 224 shown in the embodiment of FIG. 2 and thus will not be further described hereinafter. The control unit 622 includes a comparator COM1 and a delay unit DU1. The comparator COM1 is configured to compare the feedback voltage Vfb with the predetermined first voltage V1, so as to generate the comparison signal CS1 according to the comparison result. The delay unit DU1 coupled to the comparator COM1 is configured to delay the comparison signal CS1.

In the present embodiment, since the feedback voltage Vfb is increased to the level higher than the level of the first voltage V1 at the time where the overvoltage protection is occurred and maintained unchanged, the control unit 622 delays the time for outputting the corresponding signal after comparing the feedback voltage Vfb with the first voltage V1 to achieve the trigger of the short-circuit protection.

Taking the operation condition that the LED string LED1 is short-circuited and the LED strings LED2 to LEDn are open-circuited as the example again, when the feedback voltage Vfb is larger than the first voltage V1 at time ts', the comparator COM1 generates the enabled comparison signal CS1. After the enabled comparison signal CS1 is received by the delay unit DU1, the delay unit DU1 outputs the enabled comparison signal CS1 at the time ts where the delay period DLY1 (for example, tens or hundreds of milliseconds, the length of the delay period DLY1 can be changed according to the design) is already passed to trigger the short-circuit protection of the short-circuit protection unit 224, so as to prohibit the current from flowing through the short-circuited LED string LED1.

Further, much alike the embodiment of FIG. 4B, the control unit 622 of the present embodiment can trigger the short-circuit protection of the short-circuit protection unit 224 according to a plurality of different trigger conditions by using the OR operation. The operation method and the structure of the control unit 622 may be referred to as that described in the embodiment in FIG. 4B and thus will not be further described hereinafter.

Figure 8:
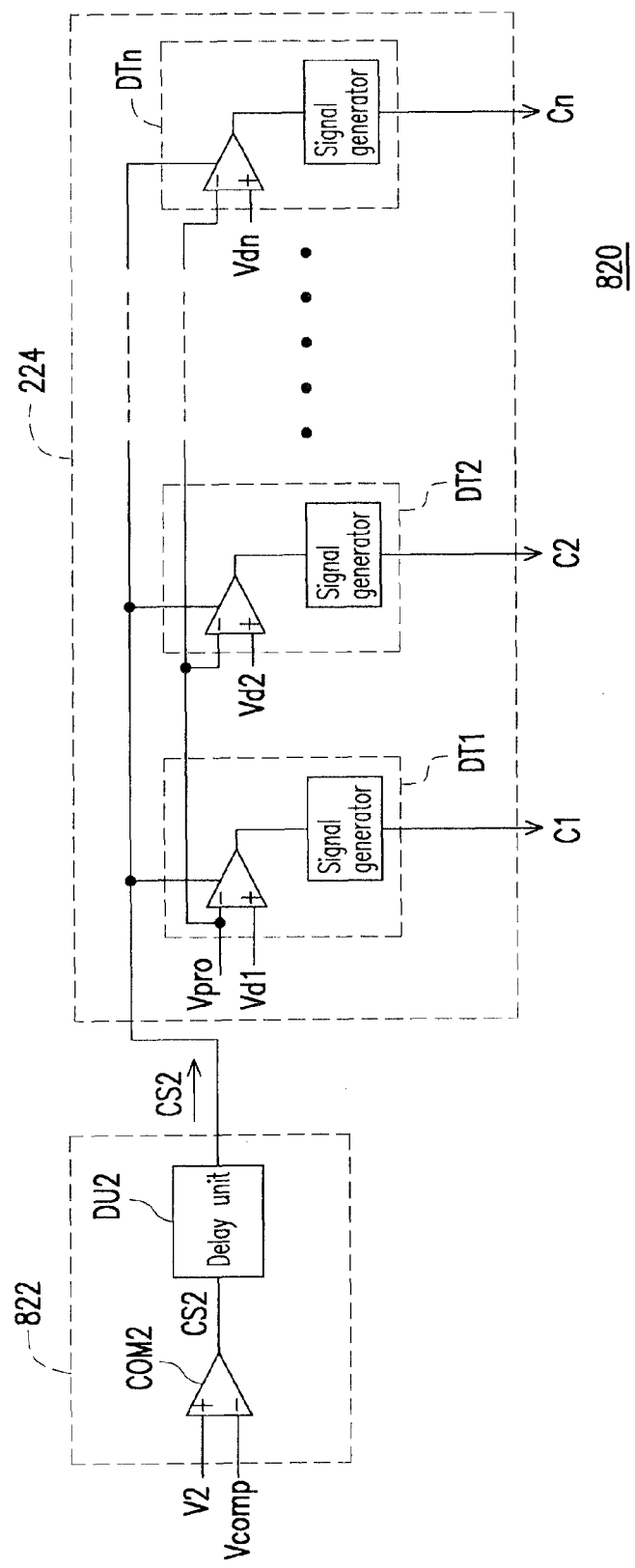
FIG. 8 is a schematic diagram showing a short-circuit protection circuit of an LED according to another embodiment of the present invention.
Figure 9:
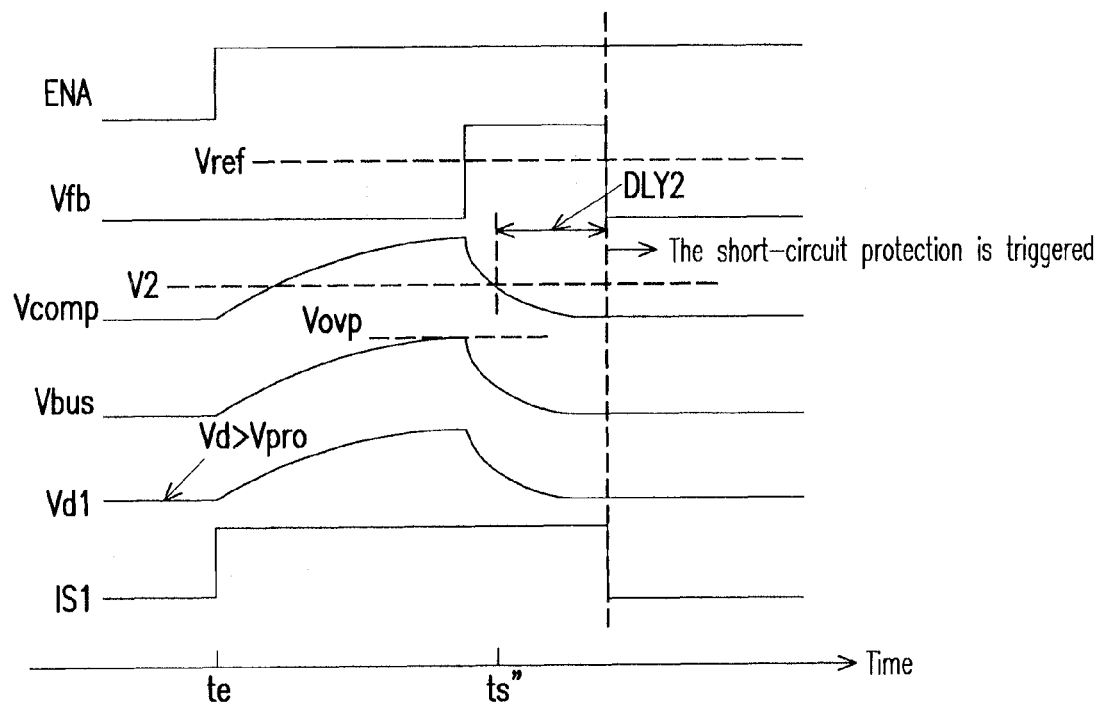
FIG. 9 is a signal timing diagram of the LED driving apparatus according to the embodiment shown in FIG. 8 of the present invention.

FIG. 8 is a schematic diagram showing a short-circuit protection circuit of an LED according to another embodiment of the present invention. FIG. 9 is a signal timing diagram of the LED driving apparatus according to the embodiment shown in FIG. 8 of the present invention. Herein, the short-circuit protection circuit 820 is also adapted to execute the short-circuit protection to the LED strings LED1 to LEDn in the LED driving apparatus 100.

Referring to FIGS. 8 and 9, the short-circuit protection circuit 820 includes a control unit 822 and a short-circuit protection unit 224, where the structure and the operation method of the short-circuit protection unit 224 are as same as the structure and the operation method of the short-circuit protection unit 224 shown in the embodiment of FIG. 2 and therefore no detailed description is further provided herein. The control unit 822 includes a comparator COM2 and a delay unit DU2. The comparator COM2 is configured to compare the compensation voltage Vcomp with the predetermined second voltage V2, so as to generate the comparison signal CS2 according to the comparison result. The delay unit DU2 coupled to the comparator COM2 is configured to delay the comparison signal CS2.

In the present embodiment, since the compensation voltage Vcomp is gradually decreased to the ground voltage GND from the time where the overvoltage protection is executed, the control unit 822 delays the time for outputting the corresponding signal after comparing the compensation voltage Vcomp with the second voltage V2 to achieve the trigger of the short-circuit protection.

Taking the operation condition that the LED string LED1 is short-circuited and the LED strings LED2 to LEDn are open-circuited as the example again, when the compensation voltage Vcomp is lower than the second voltage V2 at time ts", the comparator COM2 generates the enabled comparison signal CS2. After the enabled comparison signal CS2 is received by the delay unit DU2, the delay unit DU2 outputs the enabled comparison signal CS2 at the time where the delay period DLY2 (for example, tens or hundreds of milliseconds, the length of the delay period DLY2 can be changed according to the design) is already passed to trigger the short-circuit protection of the short-circuit protection unit 224, so as to prohibit the current from flowing through the short-circuited LED string LED1.

Further, much alike the embodiment of FIG. 4B, the control unit 822 of the present embodiment can trigger the short-circuit protection of the short-circuit protection unit 224 according to a plurality of different trigger conditions by using the OR operation. The operation method and the structure of the control unit 822 may be referred to as that described in the embodiment in FIG. 4B and thus will not be further described hereinafter.

Figure 10:
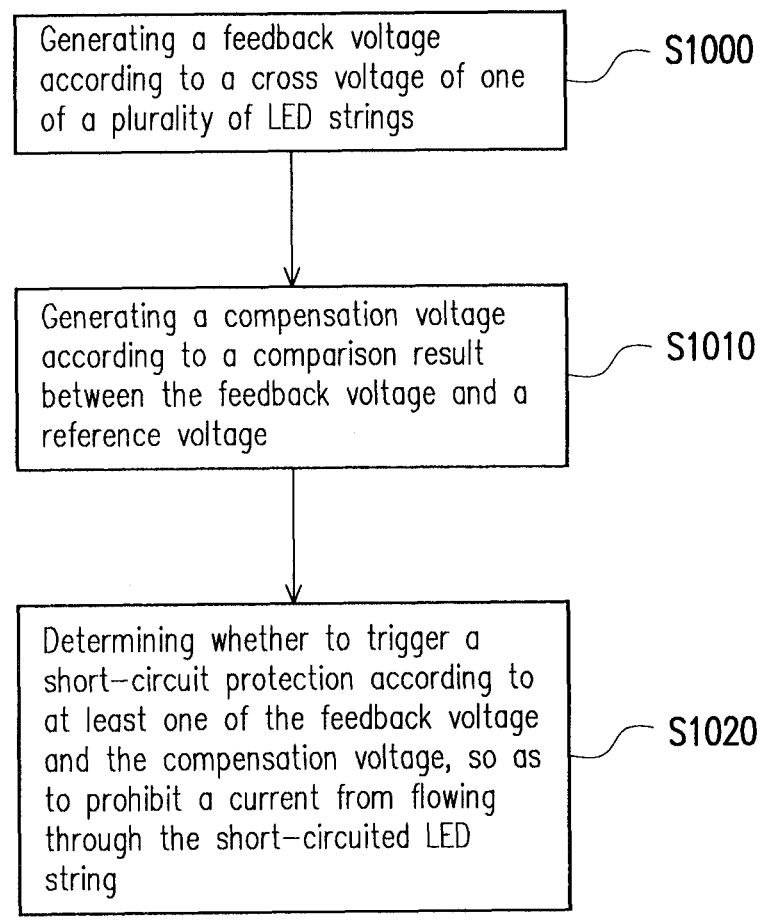
FIG. 10 is a flowchart showing a short-circuit protection method of an LED according to an embodiment of the present invention.

FIG. 10 is a flowchart showing a circuit protection method of an LED according to an embodiment of the present invention. Referring to FIG. 10, in the short-circuit protection method illustrated in the present embodiment, the driving circuit (such as the driving circuit 110 shown in FIG. 1) of the LEDs provides the driving voltage to drive a plurality of the LED strings (such as LED strings LED1 to LEDn shown in FIG. 1) after the activation. In the operation of driving the LED strings by the driving circuit, the driving circuit generates the feedback voltage according to a cross voltage of one of the LED strings (Step S1000). In addition, the compensation voltage is generated according to the comparison result between the feedback voltage and the reference voltage (Step S1010), where the compensation voltage is employed for controlling the power supply of the LED strings.

Next, the short-circuit protection circuit (such as short-circuit protection circuits 120, 220, 420, 420', 620 or 820 shown in previous figures) determines whether to trigger the short-circuit protection according to at least one of the feedback voltage and the compensation voltage generated by the driving circuit, so as to prohibit the current from flowing through the short-circuited LED string (Step S1020). In the present embodiment, steps S1010 to S1020 for determining whether to trigger the short-circuit protection can be implemented by setting the trigger condition. For example, the trigger condition such as determining whether the feedback voltage is substantially equal to the reference voltage. When the feedback voltage is substantially equal to the reference voltage, the short-circuit protection is triggered by the short-circuit protection circuit.

Figure 11:
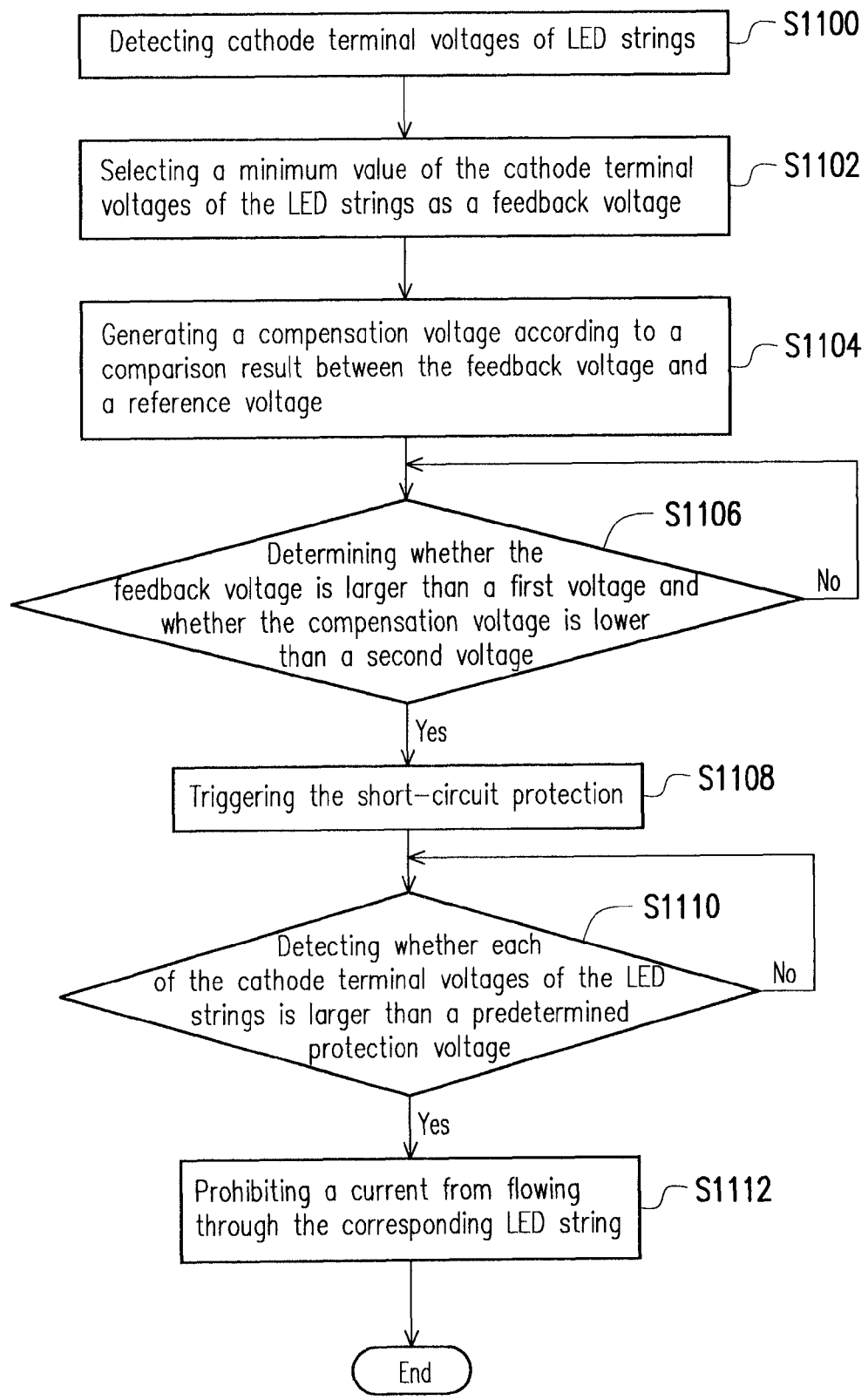
FIG. 11 is a flowchart showing a short-circuit protection method of an LED according to another embodiment of the present invention.

FIG. 11 is a flowchart showing a short-circuit protection method of an LED according to another embodiment of the present invention. Referring to FIG. 11, in the short-circuit protection method of the present embodiment, the driving circuit (such as driving circuit 110 shown in FIG. 1) of the LEDs provides a driving voltage to drive a plurality of LED strings (such as LED strings LED1 to LEDn shown in FIG. 1). In the operation of driving the LED strings by the driving circuit, the driving circuit detects the cathode terminal voltages of the LED strings (Step S1100), so as to select the minimum value of the cathode terminal voltages of the LED strings as the feedback voltage (Step S1102). Further, the compensation voltage is generated according to the comparison result between the feedback voltage and the reference voltage (Step S1104).

Next, the short-circuit protection circuit (such as short-circuit protection circuit 420 shown in FIG. 4A) determines whether the feedback voltage is larger than the first voltage and whether the compensation voltage is lower than the second voltage (Step S1106). When the feedback voltage is larger than the first voltage and the compensation voltage is lower than the second voltage, the short-circuit protection is thus triggered by the short-circuit protection circuit (Step S1108).

Under the situation that the short-circuit protection is triggered, the short-circuit protection circuit detects whether each of the cathode terminal voltages of the LED strings is larger than the predetermined protection voltage (Step S1110). When the cathode terminal voltage of the LED string is larger than the protection voltage, the current is prohibited from flowing through the corresponding LED string (Step S1112).

Figure 12:
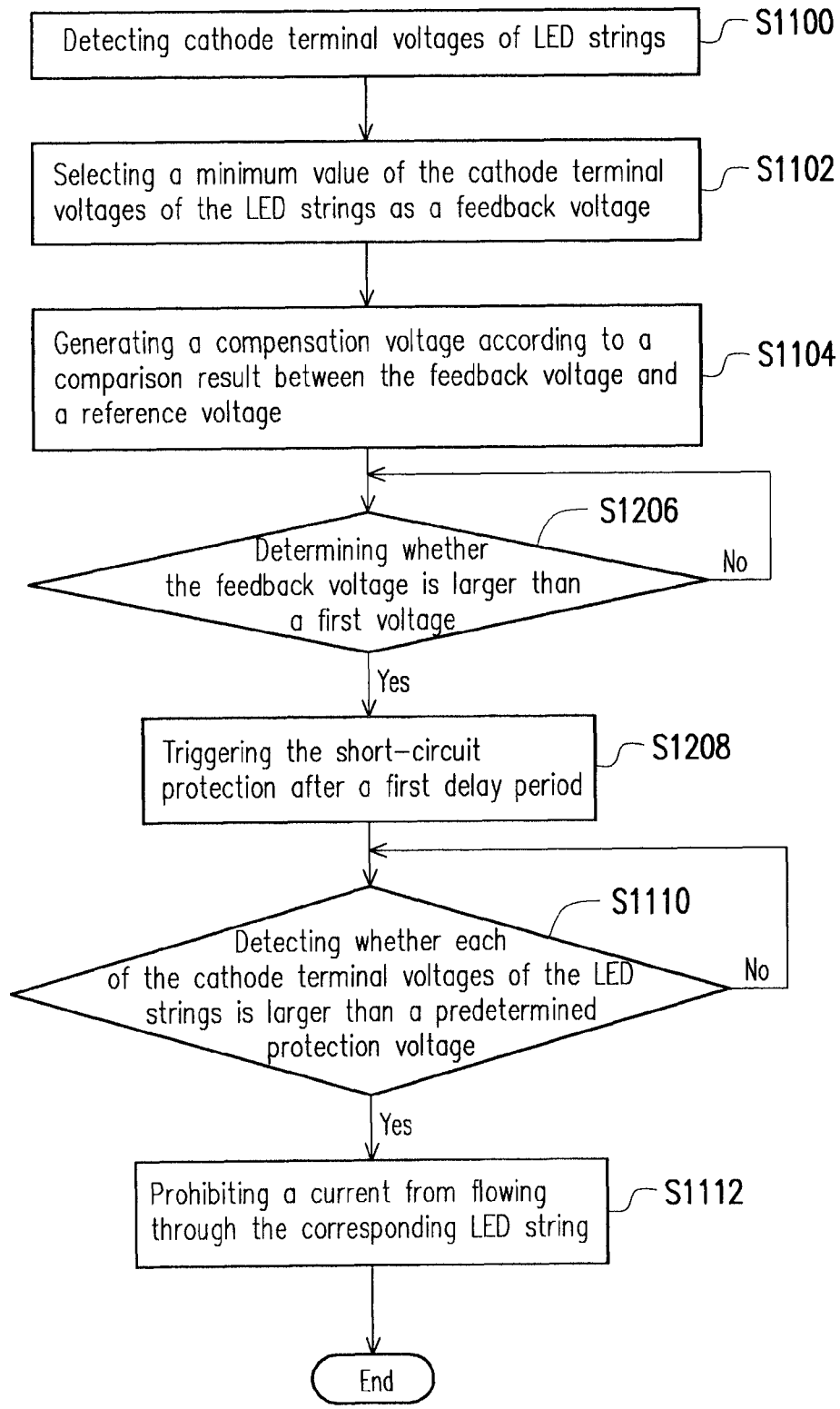
FIG. 12 is a flowchart showing a short-circuit protection method of an LED according to another embodiment of the present invention.

FIG. 12 is a flowchart showing a short-circuit protection method of an LED according to another embodiment of the present invention. Referring to FIG. 12, in the short-circuit protection method of the present embodiment, the steps S1100 to S1104 are as same as the steps S1100 to S1104 shown in the embodiment of FIG. 11, and therefore no detailed description is further provided herein. The present embodiment is different from the previous embodiments that the short-circuit protection circuit (such as the short-circuit protection circuit 620 shown in FIG. 6) determines whether the feedback voltage is larger than the first voltage (Step S1206) in order to trigger the short-circuit protection. When the short-circuit protection circuit determines that the feedback voltage is larger than the first voltage, the short-circuit protection circuit triggers the short-circuit protection after a first delay period (Step S1208). The steps S1110 and S1112 of executing the short-circuit protection in the present embodiment are the same as those described in the embodiment of FIG. 11, and therefore no detailed description is further provided herein.

Figure 13:
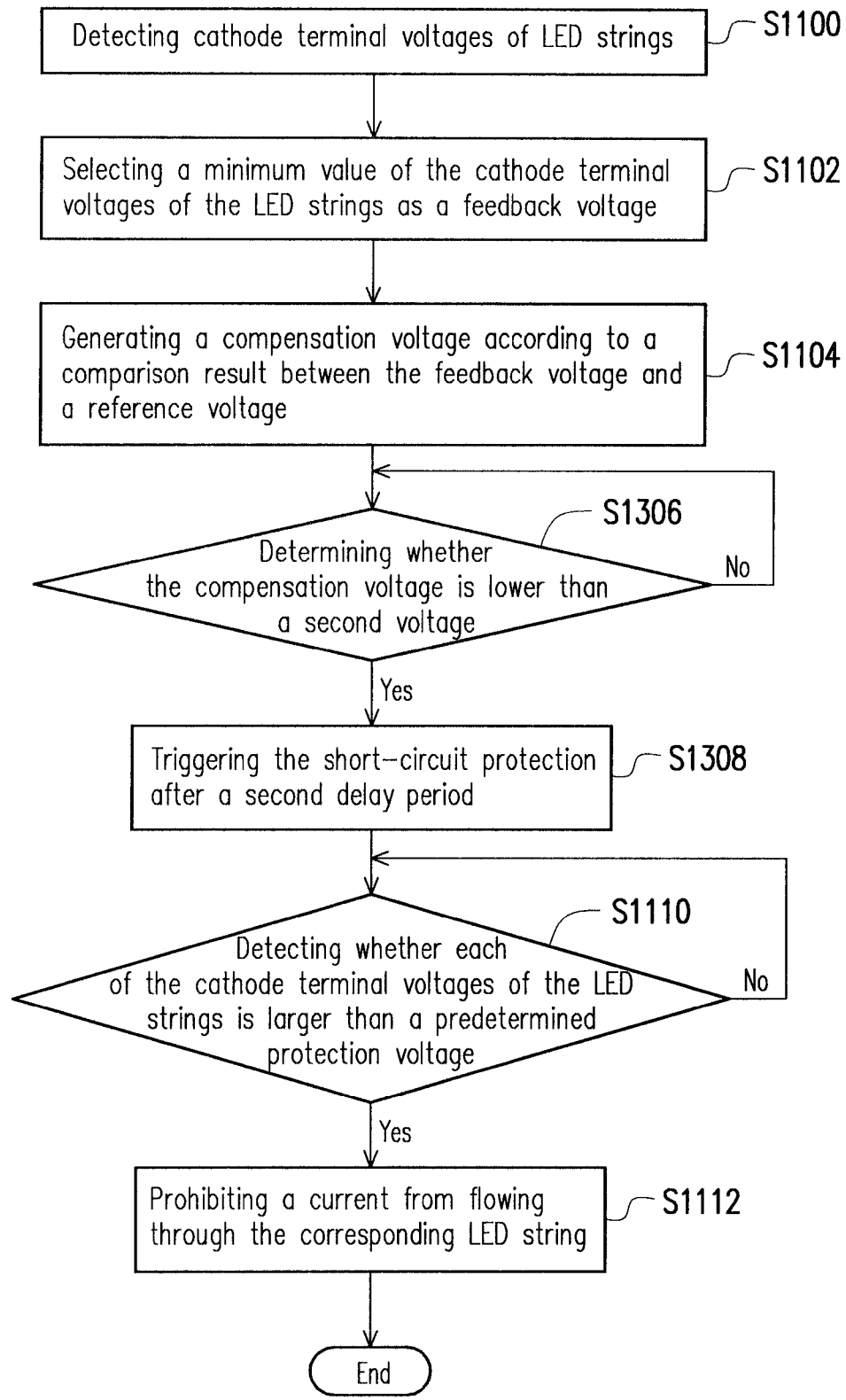
FIG. 13 is a flowchart showing a short-circuit protection method of an LED according to another embodiment of the present invention.

FIG. 13 is a flowchart showing a short-circuit protection method of an LED according to another embodiment of the present invention. Referring to FIG. 13, in the short-circuit protection method of the present embodiment, the steps S1100 to S1104 are as same as the steps S1100 to S1104 shown in the embodiment of FIG. 11, and therefore no detailed description is further provided herein. The present embodiment is different from the previous embodiments that the short-circuit protection circuit (such as the short-circuit protection circuit 820 shown in FIG. 8) determines whether the compensation voltage is lower than the second voltage (Step S1306) in order to trigger the short-circuit protection. When the short-circuit protection circuit determines that the compensation voltage is lower than the second voltage, the short-circuit protection circuit triggers the short-circuit protection after a second delay period (Step S1308). The steps S1110 and S1112 of executing the short-circuit protection in the present embodiment and the steps S1110 and S1112 shown in the embodiment of FIG. 11 are the same, and therefore no detailed description is further provided herein.

The short-circuit protection method shown in FIGS. 10 to 13 can be sufficiently taught and supported from the descriptions of FIGS. 1 to 9, so the similarities are not described herein.

Moreover, in another embodiment, the OR operation can be employed in the steps of determining whether to trigger the short-circuit protection (such as the steps S1106 to S1108, S1206 to S1208 and S1306 to S1308) to combine the different trigger conditions. For example, in another embodiment, when at least one of the trigger conditions shown in the embodiments of FIGS. 11 to 13 and the trigger condition of "determining whether the feedback voltage is substantially equal to the reference voltage" is achieved, the short-circuit protection is triggered by the short-circuit protection circuit. That is to say, the steps of determining whether to trigger the short-circuit protection can be designed to combine the trigger conditions shown in FIG. 11-13 and the trigger condition of "determining whether the feedback voltage is substantially equal to the reference voltage". In other words, the short-circuit protection method of the present invention is not limited to the step flows shown in the figures.

The present embodiment provides a short-circuit protection circuit of an LED and a short-circuit protection method thereof and an LED driving apparatus using the same. The condition of certain parameters of the driving circuit is employed by the short-circuit protection circuit as the basis of triggering the short-circuit protection, so as to avoid the malfunction of the LED under different operation states. In other words, even when a portion of the LEDs is short-circuited and another portion of the LEDs is open-circuited, the short-circuit protection is still correctly triggered by the short-circuit protection circuit, so as to enhance the control stability of the LED driving apparatus.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A short-circuit protection circuit of a light emitting diode (LED), for protecting a plurality of LED strings from a short-circuit condition, the short-circuit protection circuit comprises:
    a short-circuit protection unit, coupled to the plurality of LED strings and configured to execute a short-circuit protection;
    a control unit, coupled to the short-circuit protection unit and the LED strings and configured to control the short-circuit protection unit according to at least one of a feedback voltage and a compensation voltage, so as to determine whether to trigger the short-circuit protection; and
    a plurality of detection units, respectively coupled to the LED strings and respectively detecting a cathode terminal voltage of each of the LED strings when the short-circuit protection is triggered to respectively determine whether the cathode terminal voltage of each of the LED strings is larger than a protection voltage, wherein when the detection unit corresponding to at least one LED string of the LED strings detects that the cathode terminal voltage of at least one of the LED string is larger than the protection voltage, a current is prohibited from flowing through the at least one LED string by the detection unit,
    wherein the feedback voltage is generated according to a cross voltage of one of the LED strings, the compensation voltage is generated according to a comparison result between the feedback voltage and a reference voltage, and the compensation voltage is employed to control a power supply of the LED strings.

2. The short-circuit protection circuit as claimed in claim 1, wherein a minimum value of the cathode voltages of the LED strings is selected as the feedback voltage.

3. The short-circuit protection circuit as claimed in claim 1, wherein the control unit comprises:
    a first comparator, configured to compare the feedback voltage with a first voltage, so as to generate a first comparison signal;
    a second comparator, configured to compare the compensation voltage with a second voltage, so as to generate a second comparison signal; and
    an AND gate, coupled to the first comparator and the second comparator, and configured to generate a first logic signal according to the first comparison signal and the second comparison signal.

4. The short-circuit protection circuit as claimed in claim 3, wherein when the feedback voltage is larger than the first voltage and the compensation voltage is lower than the second voltage, the AND gate generates the enabled first logic signal according to the first comparison signal and the second comparison signal in order to trigger the short-circuit protection.

5. The short-circuit protection circuit as claimed in claim 3, wherein the control unit further comprises:
    a determination circuit, configured to determine whether the feedback voltage is substantially equal to the reference voltage in order to generate a determination signal, wherein when the feedback voltage is substantially equal to the reference voltage, the determination circuit generates the enabled determination signal; and
    an OR gate, coupled to the AND gate and the determination circuit, and configured to generate a second logic signal according to the first logic signal and the determination signal,
    wherein when at least one of the first logic signal and the determination signal is enabled, the OR gate generates the enabled second logic signal to trigger the short-circuit protection.

6. The short-circuit protection circuit as claimed in claim 1, wherein the control unit comprises:
    a first comparator, configured to compare the feedback voltage with a first voltage, so as to generate a first comparison signal; and
    a first delay unit, coupled to the first comparator, and configured to delay the first comparison signal.

7. The short-circuit protection circuit as claimed in claim 6, wherein when the feedback voltage is larger than the first voltage, the first comparator generates the enabled first comparison signal, the first delay unit outputs the enabled first comparison signal to trigger the short-circuit protection after a first delay period.

8. The short-circuit protection circuit as claimed in claim 6, wherein the control unit further comprises:
    a determination circuit, configured to determine whether the feedback voltage is substantially equal to the reference voltage in order to generate a determination signal, wherein when the feedback voltage is substantially equal to the reference voltage, the determination circuit generates the enabled determination signal; and
    an OR gate, coupled to the first delay unit and the determination circuit, and configured to generate a logic signal according to a signal outputted from the first delay unit and the determination signal,
    wherein when at least one of the first comparison signal and the determination signal is enabled, the OR gate generates the enabled logic signal to trigger the short-circuit protection.

9. The short-circuit protection circuit as claimed in claim 1, wherein the control unit comprises:
- a second comparator, configured to compare the compensation voltage with a second voltage, so as to generate a second comparison signal; and
- a second delay unit, coupled to the second comparator, and configured to delay the second comparison signal.

10. The short-circuit protection circuit as claimed in claim 9, wherein when the compensation signal is lower than the second voltage, the second comparator generates the enabled second comparison signal, the second delay unit outputs the enabled second comparison signal to trigger the short-circuit protection after a second delay period.

11. The short-circuit protection circuit as claimed in claim 9, wherein the control unit further comprises:
- a determination circuit, configured to determine whether the feedback voltage is substantially equal to the reference voltage in order to generate a determination signal, wherein when the feedback voltage is substantially equal to the reference voltage, the determination circuit generates the enabled determination signal; and
- an OR gate, coupled to the second delay unit and the determination circuit, and configured to generate a logic signal according to a signal outputted by the second delay unit and the determination signal,
- wherein when at least one of the second comparison signal and the determination signal is enabled, the OR gate generates the enabled logic signal to trigger the short-circuit protection.

12. An LED driving apparatus, for driving a plurality of LED strings, the LED driving apparatus comprises:
- a driving circuit, coupled to the LED strings, and configured to control a power supply of the LED strings according to a compensation voltage, wherein the driving circuit generates a feedback voltage according to a cross voltage of the LED strings and generates the compensation voltage according to a comparison result between the feedback voltage and a reference voltage; and
- a short-circuit protection circuit, coupled to the driving circuit and the LED strings, and configured to protect the LED strings from a short-circuit condition, the short-circuit protection circuit comprises:
  - a short-circuit protection unit, configured to execute a short-circuit protection, so as to prohibit a current from flowing through the short-circuited LED string; and
  - a control unit, coupled to the short-circuit protection unit, and configured to control the short-circuit protection unit according to one of the feedback voltage and the compensation voltage in order to determine whether to trigger the short-circuit protection; and
  - a plurality of detection units, respectively coupled to the LED strings and respectively detecting a cathode terminal voltage of each of the LED strings when the short-circuit protection is triggered to determine whether the cathode terminal voltage of each of the LED strings is larger than a protection voltage, wherein when the detection unit corresponding to at least one the LED string of the LED strings detects that the cathode terminal voltage of the at least one LED string is larger than the protection voltage, a current is prohibited from flowing through the at least one LED string of the LED strings by the detection unit.

13. The LED driving apparatus as claimed in claim 12, wherein the driving circuit detects the cathode terminal voltages of the LED strings, and selects a minimum value of the cathode terminal voltages of the LED strings as the feedback voltage.

14. A method for an LED short-circuit protection, comprising:
- generating a feedback voltage according to a cross voltage of one of a plurality of LED strings;
- generating a compensation voltage according to a comparison result between the feedback voltage and a reference voltage, wherein the compensation voltage is employed to control a power supply of the LED strings; and
- determining whether to trigger a short-circuit protection according to at least one of the feedback voltage and the compensation voltage,
- when the short-circuit protection is triggered, respectively detecting whether a cathode terminal voltage of each of the LED strings is layer than a protection voltage, and when the cathode terminal voltage of at least one LED string among the LED strings is larger than the protection voltage, prohibiting a current from flowing through the at least one LED string of the LED strings.

15. The method as claimed in claim 14, wherein the step of generating the feedback voltage according to the cross voltage of one of the LED strings comprises:
- detecting cathode terminal voltages of the LED strings; and
- selecting a minimum value of the cathode terminal voltages of the LED strings as the feedback voltage.

16. The method as claimed in claim 14, wherein the step of determining whether to trigger the short-circuit protection according to at least one of the feedback voltage and the compensation voltage comprises:
- determining whether the feedback voltage is larger than a first voltage and whether the compensation voltage is lower than a second voltage; and
- when the feedback voltage is larger than the first voltage and the compensation voltage is lower than the second voltage, triggering the short-circuit protection.

17. The method as claimed in claim 14, wherein the step of determining whether to trigger the short-circuit protection according to at least one of the feedback voltage and the compensation voltage comprises:
- determining whether the feedback voltage is larger than a first voltage; and
- when the feedback voltage is larger than the first voltage, triggering the short-circuit protection after a first delay period.

18. The method as claimed in claim 14, wherein the step of determining whether to trigger the short-circuit protection according to at least one of the feedback voltage and the compensation voltage comprises:
- determining whether the compensation voltage is lower than a second voltage; and
- when the compensation voltage is lower than the second voltage, triggering the short-circuit protection after a second delay period.

19. The method as claimed in claim 14, wherein the step of determining whether to trigger the short-circuit protection according to at least one of the feedback voltage and the compensation voltage comprises:
- determining whether the feedback voltage is substantially equal to the reference voltage; and
- when the feedback voltage is substantially equal to the reference voltage, triggering the short-circuit protection.

* * * * *